(12) United States Patent
Kim et al.

(10) Patent No.: US 9,481,262 B2
(45) Date of Patent: Nov. 1, 2016

(54) ELECTRIC VEHICLE AND METHOD

(71) Applicant: GM GLOBAL TECHNOLOGY OPERATIONS LLC, Detroit, MI (US)

(72) Inventors: Min-Joong Kim, Troy, MI (US); Jinming Liu, Saginaw, MI (US); Sean W. McGrogan, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 324 days.

(21) Appl. No.: 14/243,015

(22) Filed: Apr. 2, 2014

(65) Prior Publication Data

US 2015/0283917 A1    Oct. 8, 2015

(51) Int. Cl.
*B60L 15/20* (2006.01)
*B60L 11/18* (2006.01)
*B60L 15/00* (2006.01)

(52) U.S. Cl.
CPC ............ *B60L 15/20* (2013.01); *B60L 11/1803* (2013.01); *B60L 15/007* (2013.01); *B60L 2240/12* (2013.01); *B60L 2240/421* (2013.01); *B60L 2240/423* (2013.01); *Y02T 10/645* (2013.01); *Y02T 10/7005* (2013.01); *Y02T 10/7275* (2013.01)

(58) Field of Classification Search
CPC .. B60L 11/1803; B60L 15/20; B60L 15/007; B60L 2240/423; B60L 2240/12; B60L 2240/421; Y02T 10/7005; Y02T 10/7241; Y02T 10/7275
See application file for complete search history.

(56) References Cited

U.S. PATENT DOCUMENTS

| | | | |
|---|---|---|---|
| 8,462,529 B2 | 6/2013 | Ward et al. | |
| 8,575,879 B2 | 11/2013 | Welchko et al. | |
| 8,754,603 B2 * | 6/2014 | Arnett | H02P 21/0021 318/432 |
| 2002/0149342 A1 * | 10/2002 | Nakata | H02P 6/08 318/801 |
| 2005/0073280 A1 * | 4/2005 | Yoshinaga | H02J 3/01 318/727 |
| 2008/0028625 A1 | 2/2008 | Nudelman et al. | |
| 2009/0237021 A1 * | 9/2009 | Yamamoto | B60L 15/025 318/400.15 |
| 2010/0320950 A1 * | 12/2010 | Inoue | H02M 7/53871 318/400.26 |
| 2011/0074320 A1 * | 3/2011 | Nakamura | H02P 5/74 318/400.02 |
| 2011/0080131 A1 * | 4/2011 | Shimada | H02P 27/04 318/503 |
| 2013/0015803 A1 * | 1/2013 | Arnett | H02P 21/0021 318/503 |
| 2013/0119912 A1 * | 5/2013 | Ayano | H02M 1/32 318/472 |
| 2013/0320677 A1 * | 12/2013 | Yamada | H02M 3/1584 290/45 |
| 2015/0001958 A1 * | 1/2015 | Abe | H02J 5/005 307/104 |

\* cited by examiner

*Primary Examiner* — Thomas G Black
*Assistant Examiner* — Ce Li
(74) *Attorney, Agent, or Firm* — Quinn Law Group

(57) ABSTRACT

A vehicle includes an electric motor, a direct current power source, and an inverter operatively connected to the direct current power source and the electric motor. The inverter is configured to convert direct current from the power source to alternating current and to transmit the alternating current to the electric motor. The inverter is characterized by an on status and an off status. A controller is operatively connected to the inverter and is configured to control whether the inverter is on or off. The controller is configured to selectively cause the inverter to enter a mode of operation in which the inverter cycles between being on and off.

17 Claims, 3 Drawing Sheets

ELECTRIC VEHICLE AND METHOD

TECHNICAL FIELD

This invention relates to electric vehicle powertrains.

BACKGROUND

Electric motor drive systems typically include an alternating current (AC) electric motor, a power converter and a direct current (DC) power source, such as a storage battery. The power converter typically includes an inverter that converts the direct current from the power source to alternating current to drive the electric motor. The inverter includes switches that switch in a complementary manner to perform a rapid pulse width modulation (PWM) switching function that converts the DC power to AC power. This AC power drives the AC electric motor, which in turn drives a wheel.

SUMMARY

A vehicle includes an electric motor, a direct current power source, and an inverter operatively connected to the direct current power source and the electric motor. The inverter is configured to convert direct current from the power source to alternating current and to transmit the alternating current to the electric motor. The inverter is characterized by an on status and an off status. A controller is operatively connected to the inverter and is configured to control whether the inverter is on or off. The controller is configured to selectively cause the inverter to enter a mode of operation in which the inverter cycles between being on and off.

During certain vehicle conditions, the cycling of the inverter between being on and off results in lower power loss in the motor and inverter. A corresponding method is also provided.

The above features and advantages and other features and advantages of the present invention are readily apparent from the following detailed description of the best modes for carrying out the invention when taken in connection with the accompanying drawings.

DETAILED DESCRIPTION

Figure 1:
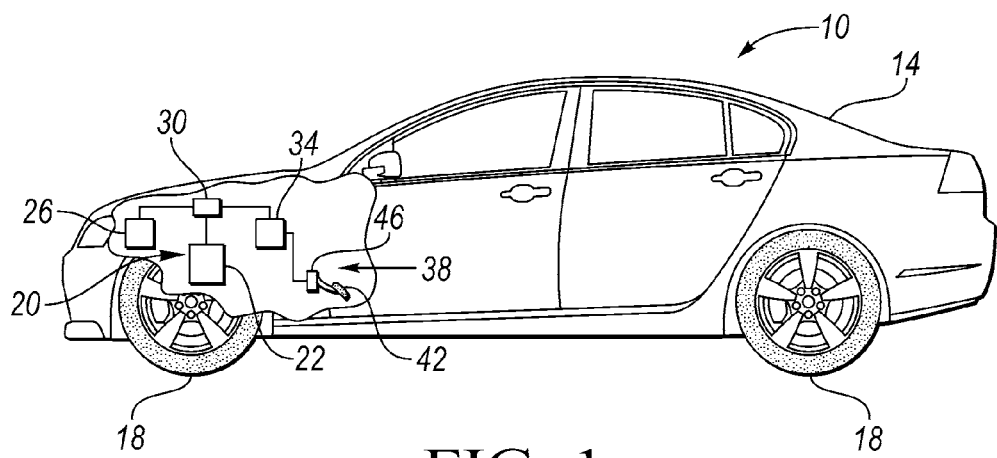
FIG. 1 is a schematic, partial cut-away, side view of a vehicle having an electric powertrain including a power source, an inverter, and an electric motor.

Referring to FIG. 1, a vehicle 10 includes a vehicle body 14. The vehicle 10 also includes a plurality of wheels 18 that rotatably support the body 14 above the ground, i.e., the surface on which the vehicle is resting or traveling. The vehicle 10 also includes a powertrain 20, including an electric motor 22. The electric motor 22 is operatively connected to at least one of the wheels 18 to transmit torque thereto and thereby propel the vehicle 10. The motor 22 may be connected to the wheel 18 directly or indirectly, such as via a multi-speed transmission. The powertrain 20 also includes an electrical power source, such as a battery 26, which supplies electrical energy for the motor 22.

In the embodiment depicted, the powertrain 20 is a battery-electric powertrain, i.e., the battery is the only source of energy for powering the motor 22. However, other powertrain configurations having an electric motor may be employed within the scope of the claims. For example, the powertrain may also be a hybrid-electric powertrain in which an engine also provides power to propel the vehicle, in series or in parallel with the motor 22.

The motor 22 is a permanent magnet motor that uses alternating current. The battery 26 provides direct current. The powertrain 20 includes an inverter 30 that is operatively connected to the battery 26 such that the inverter 30 receives the direct current from the battery 26 and converts it to alternating current. The inverter 30 is operatively connected to the motor 22 to transmit the alternating current thereto.

The powertrain 20 also includes a controller 34 that is operatively connected to the inverter 30 and motor 22 such that the controller 34 controls the inverter 30 and the motor 22. The controller 34 may be a general-purpose digital computer, generally including a microprocessor or central processing unit, read only memory (ROM), random access memory (RAM), electrically programmable read only memory (EPROM), high speed clock, analog to digital (A/D) and digital to analog (D/A) circuitry, and input/output circuitry and devices (I/O) and appropriate signal conditioning and buffer circuitry. The controller may have a set of control algorithms, including resident program instructions and calibrations stored in ROM and executed to provide the respective functions of the controller. As used herein, a "controller" may include one or more controllers, microprocessors, central processing units, or other devices that cooperate to perform the operations described herein.

The vehicle 10 also includes an input device 38 that is operable by a human driver of the vehicle 10 to input a desired or requested torque output of the motor 22. In the embodiment depicted, the input device 38 includes a foot pedal 42 that is selectively depressible. The input device 38 also includes a sensor 46 that determines the position of the pedal 42 and transmits a signal indicative of the position of the pedal 42 to the controller 34. Typically, a larger displacement of the pedal from its default, upright position is indicative of a higher requested torque. When the pedal 42 is not depressed, then the requested torque is zero. The controller 34 controls the torque output of the motor 22 by regulating the amount of energy transmitted to the motor 22 from the battery 26 via the inverter 30 in response to the position of the pedal 42.

Figure 4:
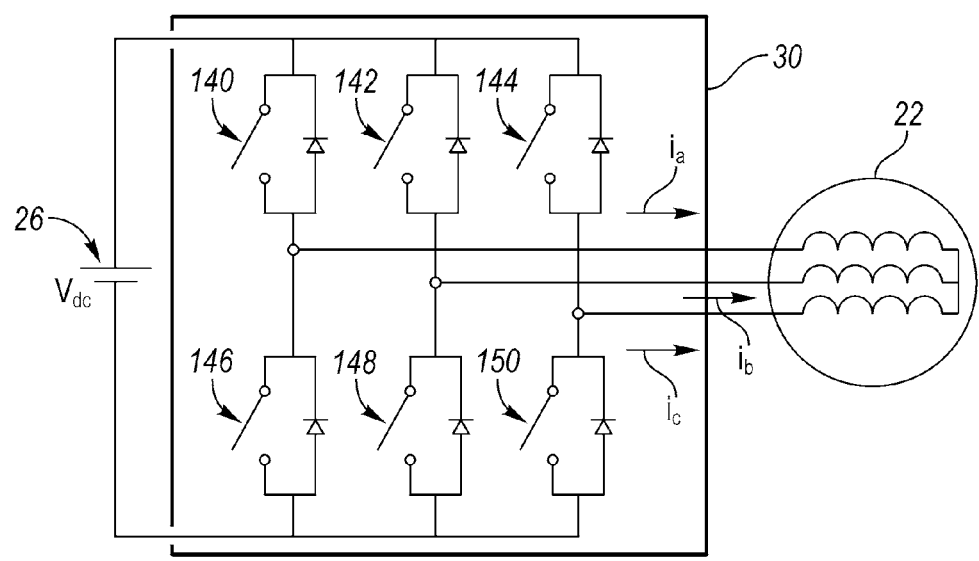
FIG. 4 is a schematic depiction of the inverter of FIG. 1.

Referring to FIG. 4, the inverter 30 in the embodiment depicted includes a three-phase circuit coupled to the motor 22. More specifically, the inverter 30 includes a switch network having a first input coupled to the battery 26 and an output coupled to the motor 22. The switch network comprises three pairs (a, b, and c) of series switches with antiparallel diodes (i.e., antiparallel to each switch) corresponding to each of the phases of the motor 30. Each of the pairs of series switches comprises a first switch, or transistor, (i.e., a "high" switch) 140, 142, and 144 having a first terminal coupled to a positive electrode of the battery 26 and a second switch (i.e., a "low" switch) 146, 148, and 150 having a second terminal coupled to a negative electrode of the battery 26 and a first terminal coupled to a second terminal of the respective first switch 140, 142, and 144.

The switches 140, 142, 144, 146, 148, 150 are switched at a controlled frequency according to command signals from the controller 34 to generate a desired voltage waveform resulting in three-phased AC output $i_a$, $i_b$, $i_c$ in the motor 22. As used herein, the inverter 30 is in an "on" state when the switches of the inverter 30 are actively switching (in response to signals from the controller 34), and the inverter 30 is in an "off" state when the switches of the inverter 30 are not switching (i.e., are inactive). Generally, the controller 34 produces a pulse width modulation (PWM) signal for controlling the switching action of the inverter 30. The PWM signal causes the inverter 30 to be on, i.e., the PWM signal causes the switches to be actively switching and thereby convert the DC current of the battery 26 to the AC current used by the motor 22. Removal of the PWM signal causes the inverter 30 to be off, i.e., the switches become inactive. Although the inverter 30 and motor 22 of the embodiment depicted are characterized by three phases, any quantity of phases may be employed within the scope of the claimed invention.

Figure 2:
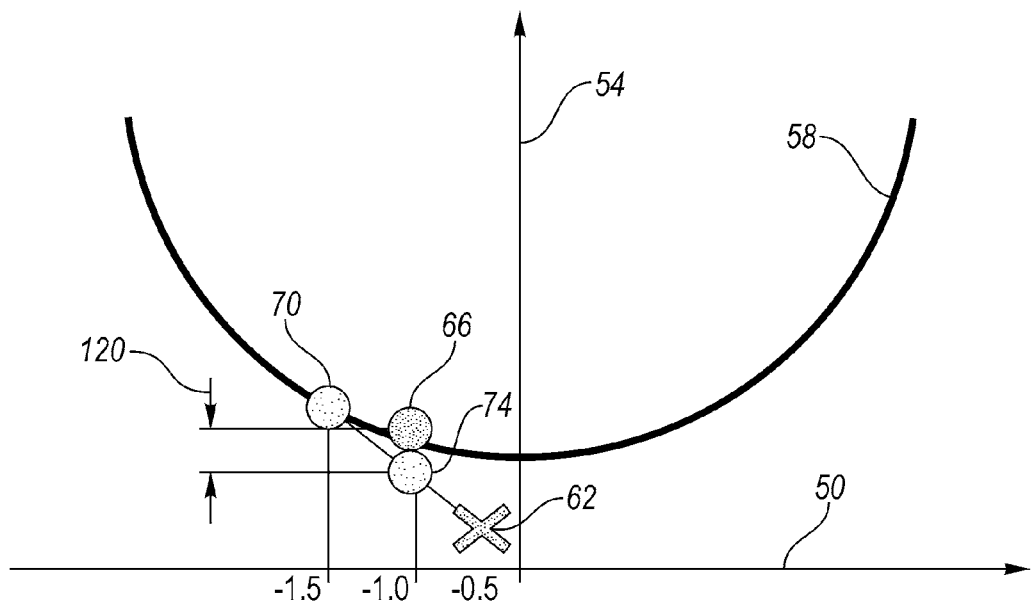
FIG. 2 is a graph depicting energy loss of the electric motor and inverter as a function of motor torque.

FIG. 2 is a graph that depicts the relationship between electric power losses of the motor 22 and the inverter 30 as a function of motor torque. Referring to FIGS. 1 and 2, the horizontal axis 50 represents the torque output of the motor 22. The vertical axis 54 represents power loss (e.g., in watts). The line 58 represents the combined power loss of the motor 22 and inverter 30 as a function of the torque output of the motor 22 when the inverter is "on." The loss varies with speed of the motor 22; line 58 represents the loss at one motor speed. At other motor speeds, the specific values will differ, but the shape of the line 58 will be substantially similar.

If the inverter 30 is turned off and the requested torque is zero, the torque output of the motor 22 will be slightly negative due to the permanent magnets. More specifically, the rotating rotor of the motor 22 will induce a current due to the changing magnetic field produced by the permanent magnets. In the embodiment depicted, and at the motor speed represented by line 58, the torque output of the motor 22 is −0.5 Nm (point 62 in FIG. 2) when there is zero requested torque. If the vehicle 10 is coasting down, i.e., if the driver of the vehicle 10 intends the vehicle to slowly reduce speed by inputting a zero torque request via the input device 38, then it is acceptable for the torque output of the motor 22 to be even lower, e.g., −1.0 Nm. At −1.0 Nm in the example depicted in FIG. 2, the power loss with the inverter 30 on is shown at point 66.

Figure 3:
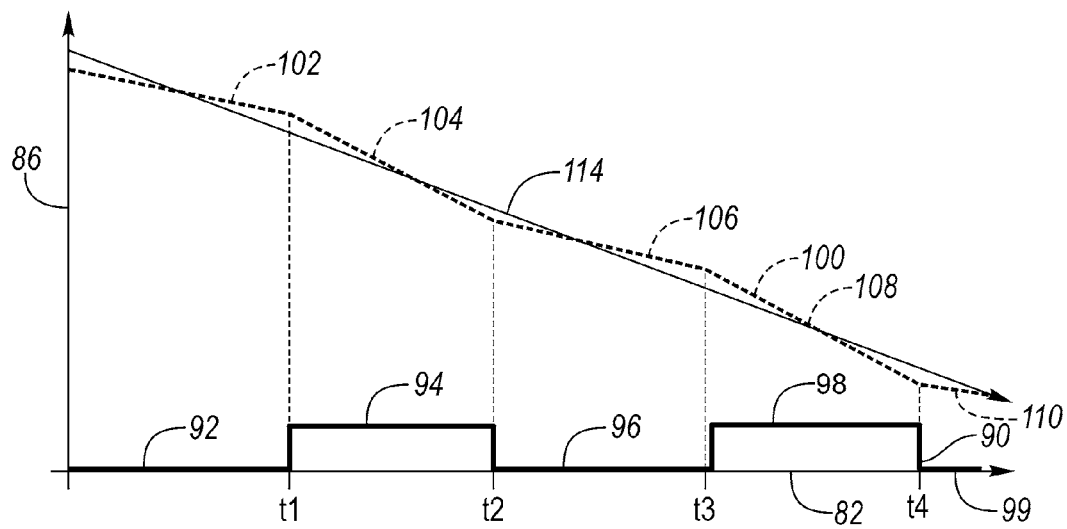
FIG. 3 is a graph depicting the status of the inverter and the speed of the vehicle when the inverter is cycled between being on and off.

FIG. 3 is a graph depicting the status of the inverter and the speed of the vehicle 10 as a result of a method of controlling the powertrain 20 performed by the controller 34. Referring to FIGS. 1 and 3, the horizontal axis 82 represents time, and the vertical axis 86 represents the speed of the vehicle 10. The status of the inverter 30 (i.e., whether the inverter 30 is on or off) is represented by line 90. When the inverter is off, line 90 is on the horizontal axis 82; when the inverter 30 is on, the line 90 is elevated above the horizontal axis 82. Thus, segment 92 of line 90, between when the time is zero and time $t_1$, represents the inverter being off; segment 94 of line 90, between time $t_1$ and $t_2$, represents the inverter being on.

The controller 34 is configured to selectively cause the inverter 30 to enter a mode of operation in which the inverter 30 cycles back and forth between being on and off. More specifically, the controller 34 is configured to cause the inverter 30 to enter the mode of operation in which the inverter 30 cycles back and forth between being on and off in response to receiving a non-zero torque request from the input device 38. This mode of operation is depicted in the graph of FIG. 3, in which line 90 shows the inverter 30 alternating or cycling back and forth between being on and off. In the embodiment depicted, the controller 34 causes the inverter 30 to be on by transmitting PWM signals to the inverter 30, and causes the inverter to be off by not transmitting the PWM signals to the inverter 30.

More specifically, segment 92 of line 90, between when the time is zero and time $t_1$, represents the inverter being off; segment 94 of line 90, between time $t_1$ and $t_2$, represents the inverter being on; segment 96 of line 90, between time $t_2$ and $t_3$, represents the inverter being off; segment 98 of line 90, between time $t_3$ and $t_4$, represents the inverter being on; segment 99 of line 90, after time $t_4$, represents the inverter being off. Thus, during the mode of operation, the inverter 30 cycles back and forth between being on and off.

During this mode of operation, the output torque of the motor 22 is negative, and the output torque of the motor 22 is lower when the inverter 30 is on than when the inverter 30 is off. In the scenario depicted in FIGS. 2 and 3, the output torque of the motor 22 is −0.5 Nm when the inverter 30 is off, and the output torque of the motor 22 is −1.5 Nm when the inverter 30 is on.

The difference in torque output of the motor 22 between when the inverter 30 is on and when the inverter 30 is off is reflected in the speed of the vehicle 10. Line 100 represents the speed of the vehicle 10 as a function of time. Segment 102 of line 100 is between time zero and time $t_1$, when the inverter is off; segment 104 of line 100 is between time $t_1$ and $t_2$, when the inverter is on; segment 106 of line 100 is between time $t_2$ and $t_3$, when the inverter is off; segment 108 of line 100 is between time $t_3$ and $t_4$, when the inverter is on; segment 110 of line 100 is after time $t_4$, when the inverter is off.

Segments 102, 106, and 110 (when the inverter is off and the output torque of the motor 22 is higher (e.g., −0.5 Nm)), show lower rates of deceleration of the vehicle than segments 104 and 108 (when the inverter is on and the output torque of the motor 22 is lower (e.g., −1.5 Nm)). That is, during time periods when the inverter is on, the rate of deceleration of the vehicle 10 is higher than during time periods when the inverter is off. However, because the motor 22 alternates between −0.5 Nm and −1.5 Nm, the average torque output of the motor 22 is −1.0 Nm. Line 114 represents the speed of the vehicle 10 if the output torque of the motor 22 is −1.0 Nm. Thus, during the mode of operation in which the inverter 30 cycles between being on and off, the speed of the vehicle 10 is decreased by the same amount as if the inverter 30 remained on and had an output of −1.0 Nm of torque.

Referring again to FIG. 2, point 66 represents the power loss of the motor 22 and inverter 30 at −1.0 Nm of torque output with the inverter 30 on. Point 70 represents the power loss of the motor 22 and inverter 30 at −1.5 Nm of torque output with the inverter 30 on. Point 74 represents the average power loss during the mode of operation in which the inverter 30 cycles between the on and off conditions.

Thus, point 66 represents the power loss caused by the condition shown by line 114 in which the inverter 30 is on and the motor 22 generates −1.0 Nm of torque, whereas point 74 represents the power loss caused by the condition shown by line 100 in which the inverter 30 cycles back and forth between being on and off and the motor output cycles between −1.5 Nm and −0.5 Nm. Line 100 closely approximates line 114, but results in a smaller power loss as shown by the vertical distance 120 between points 66 and 74.

Accordingly, by cycling the inverter 30 between its on and off states, the same vehicle performance can be achieved with a smaller power loss during vehicle coast-down situations. In order to make the changes in deceleration imperceptible, it may be desirable for the controller 34 to cause the inverter 30 to cycle between being on and off at a frequency of greater than 20 hertz, and more preferably at a frequency greater than 200 hertz.

It should be noted that, due to the shape of the loss curve line 58, no benefit is achieved by alternating the inverter between being on and off (i.e., alternating between active an inactive switching) above a certain absolute value of torque. Furthermore, it should be noted that, when the motor speed is relatively high, flux weakening is required due to high back electromotive force (EMF); at these elevated motor speeds, the inverter control is required and the on/off strategy cannot be applied. It should also be noted that the output torque values of −0.5 and −1.5 are examples, and any values may be used within the scope of the claims.

Accordingly, in the embodiment depicted, the controller 34 is configured to determine whether the input device 38 indicates non-zero requested torque (e.g., whether the pedal 42 has zero displacement from its default, upright position). If the controller 34 determines that there is zero requested torque from the input device 38, then the controller 34 is configured to then determine whether the speed of the motor 22 exceeds a predetermined speed at which cycling the inverter on and off is ineffective. If the controller 34 determines that the speed of the motor 22 does not exceed the predetermined speed, then the controller 34 causes the inverter to enter the mode of operation in which the inverter cycles between being on and off. If the controller 34 determines that the speed of the motor 22 exceeds the predetermined speed, then the controller 34 does not cause the inverter 30 to enter the mode of operation, but rather maintains the inverter 30 in the "on" state (i.e., the switches in the inverter 30 are actively switching).

Figure 5:
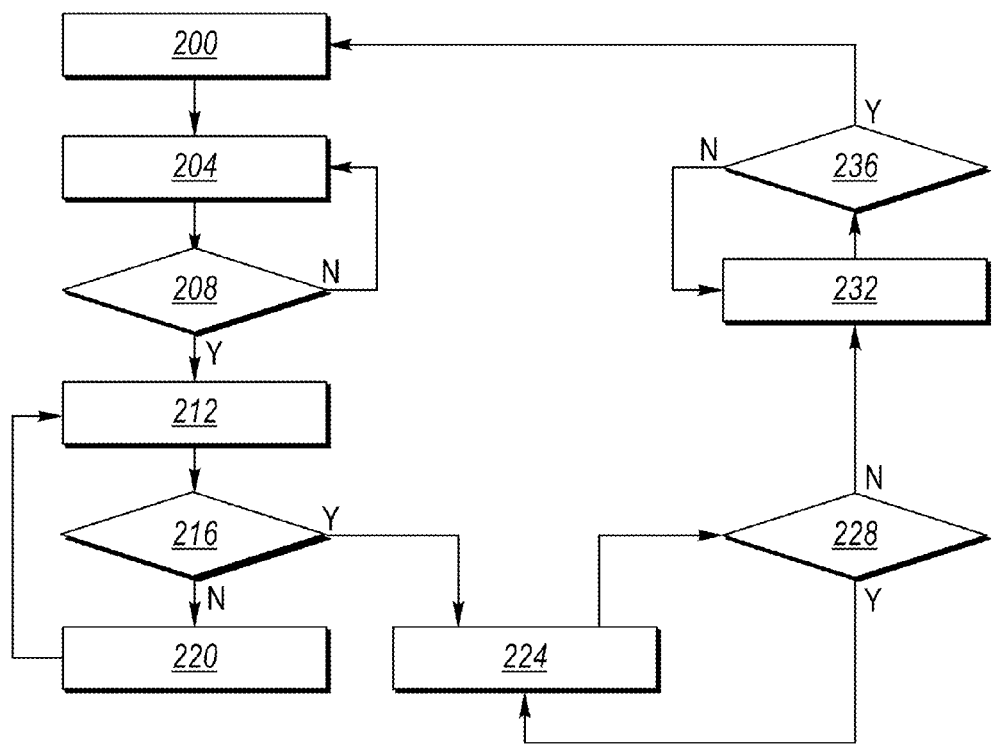
FIG. 5 is a flow diagram of a method of controlling the powertrain.

Referring to FIG. 5, an alternative method for use by the controller 34 is schematically depicted. The method begins at step 200 with normal powertrain operation. At step 204, the controller 34 monitors the torque request value ("$T_{Request}$") from the input device 30. In one embodiment, the torque request data monitored by the controller 34 is filtered, and constrained. At step 208, the controller 34 determines whether the torque request is sufficiently close to zero to implement torque switching (i.e., turning the inverter on and off).

More specifically, in the embodiment depicted, the controller performs step 208 by inquiring whether the torque request value $T_{Request}$ is between a first threshold value and a second threshold value, where the first and second threshold values define the outer limits of when torque switching is desired. If the answer to the inquiry at step 208 is no, then the controller 34 returns to step 204. If the answer to the inquiry at step 208 is yes, i.e., the requested torque value is between the first and second threshold values, then the controller 34 proceeds to step 212.

Steps 212, 216, and 220 comprise a transition from normal operation to the torque switching. At step 212, the controller 34 generates motor torque commands to which the motor 22 is responsive. The torque commands may be designated as T1 and T2, where 50 percent of the time the motor generates torque T1 and the other 50 percent of the time the motor generates torque T2, with T1 and T2 alternating over time. At step 212, T1=$T_{Request}$−X, and T2=$T_{Request}$+X, where the initial value of X is a relatively small fraction of $T_{Request}$, such as 0.1 Nm. At step 216, the controller inquires whether one of the torques (T1 or T2) in the torque command pair reached zero to indicate that the transition is complete. If the answer to the inquiry at step 216 is yes, then the controller proceeds to step 224. If the answer to the inquiry at step 216 is no, i.e., if neither T1 nor T2 has reached zero, then the controller proceeds to step 220.

At step 220, the controller increases the value of X by an amount Y. In one embodiment, Y is equal to 0.1 Nm. Thus, if the initial value of X is 0.1, then at step 220, the value of X becomes 0.2 Nm. After step 220, the controller 34 repeats step 212 with the new value of X.

Figure 6:
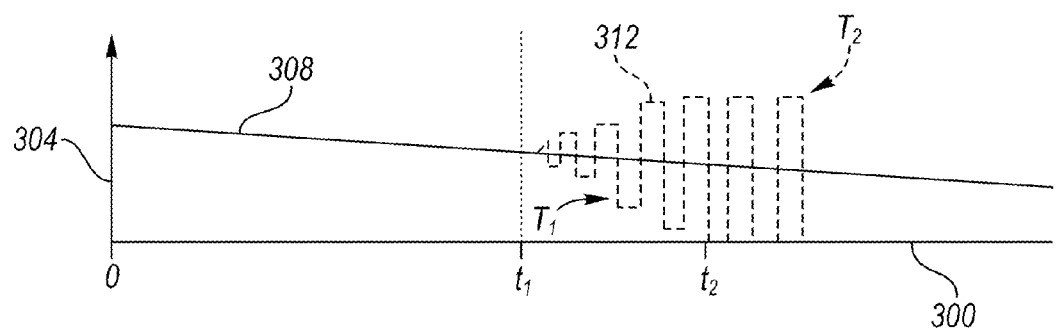
FIG. 6 is a graph of a torque request value and torque command as a function of time.

FIG. 6 is a graph depicting the relationship of the torque request value and the torque commands as a function of time. In FIG. 6, the horizontal axis 300 depicts time, and the vertical axis 304 depicts torque. The torque request is represented by line 308, and the torque command is depicted by line 312. Between time zero and time $t_1$, the controller 34 performs steps 200 and 204, i.e., the powertrain is in normal operation and the controller 34 is monitoring the torque request value from the input device 38. At time $t_1$, the controller 34 determines that the torque request is between the first and second threshold values at step 208 and begins the transition phase.

Prior to the transitional phase at $t_1$, the torque command 312 is substantially identical to the torque request 308. However, once the transitional phase begins at step 212, the torque command diverges from the torque request, and the torque command alternates between T1 and T2. As time increases, the value of X increases (when step 220 is reiterated), and thus the values of T1 and T2 decrease and increase, respectively, as shown by line 312. More specifically, T1 and T2 diverge.

Referring again to FIG. 5, the controller 34 performs step 224 when the controller 34 determines at step 216 that one of T1 and T2 has reached zero. At step 224, the controller 34 causes the motor 22 to operate in torque-switching mode, where T1 is zero, and T2 is $T_{Request}$*2 (i.e., $T_{Request}$ multiplied by 2). The torque command during step 224 is shown after time $t_2$ in FIG. 6. The controller 34 then inquires at step 228 whether it is still true that $T_{Request}$ is still between the first and second threshold values. If the answer at step 228 is yes, then the controller 34 returns to step 224. If the answer at step 228 is no, then the controller 34 proceeds to step 232, at which the controller 34 begins the transition from torque switching to normal operation.

More specifically, at step 232, the controller 34 adjusts the values of T1 and T2 such that they converge over time to $T_{Request}$ in a manner similar to that used to make T1 and T2 diverge during the transition in steps 212, 216, and 220. At step 236, the controller 34 inquires whether T1 and T2 have converged to the same value. If the answer at step 236 is yes, then the controller 34 returns to step 200. If the answer at step 236 is no, then the controller 34 continues adjusting the values of T1 and T2.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   an electric motor;
   a direct current power source;
   an input device that is manipulable by a driver to input a requested motor torque;

an inverter operatively connected to the direct current power source and the electric motor, the inverter being configured to convert direct current from the power source to alternating current and to transmit the alternating current to the electric motor, the inverter having an on status and an off status; and a controller operatively connected to the inverter and configured to control whether the inverter has the on status or the off status, wherein the controller is configured to selectively cause the inverter to enter a mode of operation in which the inverter cycles between the on and off statues, wherein the controller is further configured to cause a transition phase during which the controller generates a first commanded torque and a second commanded torque to which the motor is responsive, wherein the first commanded torque and the second commanded torque are alternating, and wherein the first commanded torque and the second commanded torque diverge from the requested motor torque and from each other until one of the first commanded torque and the second commanded torque is zero.

2. The vehicle of claim 1, wherein the controller is operatively connected to the input device to receive the requested motor torque, wherein the controller is operatively connected to the motor such that the controller controls the torque output of the motor, and wherein the controller is configured such that the controller causes the inverter to enter the mode of operation in which the inverter cycles between being on and off in response to the requested motor torque being non-zero.

3. The vehicle of claim 2, wherein the controller is configured such that the inverter does not enter the mode of operation if the speed of the motor exceeds a predetermined motor speed.

4. The vehicle of claim 2, wherein the controller is configured such that the inverter cycles between the on and off statuses at a frequency of greater than 20 hertz during the mode of operation.

5. The vehicle of claim 4, wherein the controller is configured such that the inverter cycles between the on and off statuses at a frequency of greater than 200 hertz during the mode of operation.

6. The vehicle of claim 5, wherein the electric motor is a permanent magnet electric motor.

7. The vehicle of claim 1, wherein the torque output of the motor is negative during the mode of operation in which the inverter cycles between the on and off statuses.

8. The vehicle of claim 1, wherein the torque output of the motor is lower when the inverter is on than when the inverter is off during the mode of operation.

9. The vehicle of claim 1, wherein the inverter includes a plurality of switches that actively switch when the inverter is on and that are inactive when the inverter is off.

10. The vehicle of claim 8, wherein the switches actively switch in response to a pulse width modulation signal and do not switch in the absence of the pulse width modulation signal.

11. A method of controlling the powertrain of a vehicle having a direct current power source, an electric motor, an inverter operatively interconnecting the power source and the electric motor, and an input device manipulable by a driver, the method comprising:

receiving a non-zero torque request from the input device;

causing the inverter to enter a mode of operation in which the inverter cycles between being on and off in response to the receiving of the non-zero torque request from the input device; and causing a transition phase during which are generated a first commanded torque and a second commanded torque to which the motor is responsive, wherein the first commanded torque and the second commanded torque are alternating, and wherein the first commanded torque and the second commanded torque diverge from a requested motor torque received from the input device and from each other until one of the first commanded torque and the second commanded torque is zero.

12. The method of claim 11, wherein the causing the inverter to enter a mode of operation in which the inverter cycles between being on and off includes causing the inverter to cycle between being on and off at a frequency of greater than 20 hertz.

13. The method of claim 11 wherein the causing the inverter to enter a mode of operation in which the inverter cycles between being on and off includes causing the inverter to cycle between being on and off at a frequency of greater than 200 hertz.

14. The method of claim 11, wherein the electric motor is a permanent magnet electric motor.

15. The method of claim 11, further comprising causing the torque output of the motor to be negative during the mode of operation in which the inverter cycles between being on and off.

16. The method of claim 15, further comprising causing the torque output of the motor to be lower when the inverter is on than when the inverter is off during the mode of operation.

17. A vehicle comprising:
a vehicle body;
a plurality of wheels rotatably attached to the vehicle body;
an alternating current (AC) electric motor attached to the vehicle body and operable to drive one or more of the wheels;
an input device manipulable by a driver to input a requested motor torque;
a direct current (DC) battery pack attached to the vehicle body;
an inverter electrically connected to the DC battery pack and the AC electric motor, the inverter being configured to convert direct current received from the DC battery pack to alternating current, and to transmit the alternating current to the AC electric motor, the inverter being operable in an on state and inoperable in an off state; and
a controller operatively connected to the inverter and configured to switch and to cycle the inverter between the on state and the off state, the controller being configured to cause a transition phase during which the controller generates a first commanded torque and a second commanded torque to which the AC electric motor is responsive,
wherein the first commanded torque and the second commanded torque are alternating; and
wherein the first commanded torque and the second commanded torque diverge from the requested torque and from each other until one of the first commanded torque and the second commanded torque is zero.

* * * * *